United States Patent [19]

Inoue et al.

[11] Patent Number: 4,887,115
[45] Date of Patent: Dec. 12, 1989

[54] PHOTOGRAPHIC CAMERA

[75] Inventors: Manabu Inoue, Kobe; Nobuyaki Taniguchi; Yoshiaki Hata, both of Nishinomiya; Takeo Hoda, Kawachinagano; Yoshinobu Kudo, Sakai; Hiroshi Ueda, Toyokawa, all of Japan

[73] Assignee: Minolta Camera Kabushiki Kaisha, Osaka, Japan

[21] Appl. No.: 259,897

[22] Filed: Oct. 19, 1988

Related U.S. Application Data

[62] Division of Ser. No. 160,833, Feb. 26, 1988, which is a division of Ser. No. 21,659, Mar. 4, 1987, Pat. No. 4,728,978.

[30] Foreign Application Priority Data

| Mar. 7, 1986 | [JP] | Japan | 61-50871 |
| Mar. 7, 1986 | [JP] | Japan | 61-50872 |
| Mar. 7, 1986 | [JP] | Japan | 61-50873 |
| Mar. 7, 1986 | [JP] | Japan | 61-50874 |
| Mar. 10, 1986 | [JP] | Japan | 61-52170 |

[51] Int. Cl.$^4$ .............................. G03B 17/24
[52] U.S. Cl. .................. 354/289.1; 354/412
[58] Field of Search ................ 354/412, 289.1

[56] References Cited

U.S. PATENT DOCUMENTS

| 4,217,046 | 8/1980 | Weinstein et al. | 354/76 |
| 4,286,849 | 9/1981 | Uchidoi et al. | 354/23 |
| 4,449,805 | 5/1984 | Sakurada et al. | 354/105 |
| 4,477,164 | 10/1984 | Nakai et al. | 354/286 |
| 4,560,267 | 12/1985 | Nakai et al. | 354/412 |

FOREIGN PATENT DOCUMENTS

| 54-26721 | 2/1979 | Japan . |
| 57-112724 | 7/1982 | Japan . |
| 58-126521 | 7/1983 | Japan . |
| 61-167934 | 7/1986 | Japan . |
| 2026187 | 1/1980 | United Kingdom . |

OTHER PUBLICATIONS

Shashin Kogyo (Photograph Industry), Apr. 1986, vol. 44, No. 4 (pp. 74–84 and cover page).
Camera Tsushin (Camera Communication), Feb. 1986 (pp. 19, 78–86 and cover page).

*Primary Examiner*—Michael L. Gellner
*Attorney, Agent, or Firm*—Burns, Doane, Swecker & Mathis

[57] ABSTRACT

A photographic camera records photographic information and/or development information in an IC card which includes a semiconductor memory capable of reading-out/writing-in, a circuit having a microcomputer and adapted for communication with peripherals and a data communication terminal for the communication. This photographic camera has an attaching portion for attaching the IC card, a data exchange terminal, a microcomputer-incorporated communication device for the data exchange with the IC card and a camera control device for carrying out various operations based on the data input from the IC card, through the data exchange between the microcomputer of the camera and the microcomputer of the IC card, the photographic information and/or the development information corresponding to an exposed film is recorded in the IC card those data and other information are accessible at any time and any place.

3 Claims, 8 Drawing Sheets

PHOTOGRAPHIC CAMERA

This application is a divisional, of application Ser. No. 160,833, filed Feb. 26, 1988, which is a divisional of applicaion Ser. No. 021,659, filed Mar. 4, 1987, now U.S. Pat. No. 4,728,978.

BACKGROUND OF THE INVENTION

The present invention relates to a photographic camera capable of recording photographic information or development information such as of trimming.

DESCRIPTION OF THE PRIOR ART

There have been disclosed photographic cameras or accessories capable of recording on a film exposure data including a shutter speed or an aperture value, or photographic information including a date, a time, a film serial reference number and data about a photographed object (e.g. Japanese patent application laid open under No. 51-84632).

Also, there have been disclosed cameras recording on the film trimming information at a time of photographing whereby a trimming-printing is carried out based on this information (e.g. Japanese patent application laid open under No. 54-26721). Further, there has been disclosed a device with which a data mark corresponding to particular data to be imprinted is imprinted at an edge portion of the film outwardly of a frame and this data mark is converted into a character and then this character is imprinted onto printing paper at a laboratory (Japanese patent application laid open under No. 60-260929).

However, the conventional photographic cameras of the above-described constructions have problems to be described hereinafter:

(a) Since the photographic information or the development information is imprinted in the film per se, there is a problem of space limit about recording volume and kinds of information. That is to say, kinds of information to be recorded in the film need be pre-selected.

(b) It is expected in future that the volume and kinds of photographic information or the development information which a user wishes to record will ever increase, and the conventional methods will be inadequate to cope with this trend.

(c) Also, since the above information is recorded in the film per se, the information is available for the user only after the development of the film. This is particularly inconvenient with respect to the photographic information.

Further, as for the development information, with increasing automatization of processes at a photo processing shop or at a developing laboratory, there has been demanded a method capable of accurately communicating the recorded development information.

SUMMARY OF THE INVENTION

Accordingly, it is the object of the present invention to overcome the problems of the prior art and to realize recording of great volume and kinds of information and also accurate and reliable communication thereof.

In order to achieve this object, the photographic camera according to the present invention comprises an attaching portion disposed at the camera and adapted for detachably attaching an IC card which includes semiconductor memory means capable of reading-out/-writing-in, a circuit for communication with peripherals and a data exchange terminal for the communication, communication means for communicating data with the IC card and a camera control means for carrying out various operations based on the data input from the IC card.

It is to be noted here that the data to be communicated between the camera and the IC card comprise photographic information and/or development information.

More particularly, the photographic information here includes at least one or more or all of the followings: color temperature information, exposure reference information, information such as dates and time, a time value Tv (shutter speed), an aperture value Av, an object luminance value Bv, information indicating a use or non-use of a flash device, exposure information such as an exposure adjustment, a number of times of photographing (an accummulated number of times of shutter release operations of the camera), a type of camera, a type of film, a type of filter, a size of the photographed object.

The development information here includes at least one of the followings: trimming information, the color temperature information, information concerning a film size, a frame number of the film, a number of prints, a size of print, necessities of high speed development, producing a slide(s) and of special treatment, information concerning the date and the time.

The IC card used as the memory means in the photographic camera according to the present invention is advantegeous in that;

(1) The card may have a sufficiently large memory capacity with little data storing space limit compared with the film-data-imprinting type, and the card may record great volume and kinds of photographic and-/or laboratory information.

(2) The card, being thin, is easy to be attach the back lid.

(3) In comparison with a magnetic disk system, the card is advantageous in space requirement since a mechanical drive device is not necessary.

(4) Access to information (writing-in and reading-out of information) may be executed very speedily.

(5) The card is superior to other systems in its adaptability for great variety of uses.

DESCRIPTION OF THE PREFERRED EMBODIMENTS

Preferred embodiments of the present invention will be particularly described hereinafter with reference to the accompanying drawings.

Figure 1A:
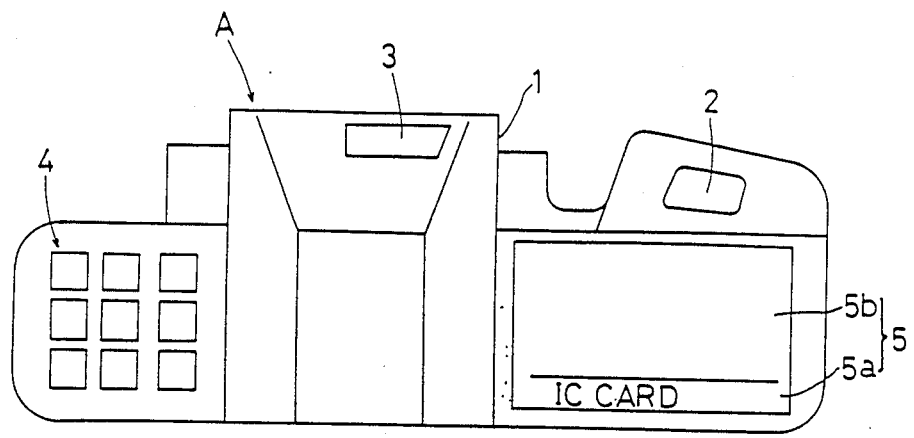
FIG. 1a is a plan view showing an outer configuration of a photographic camera related to the present invention.
Figure 1B:
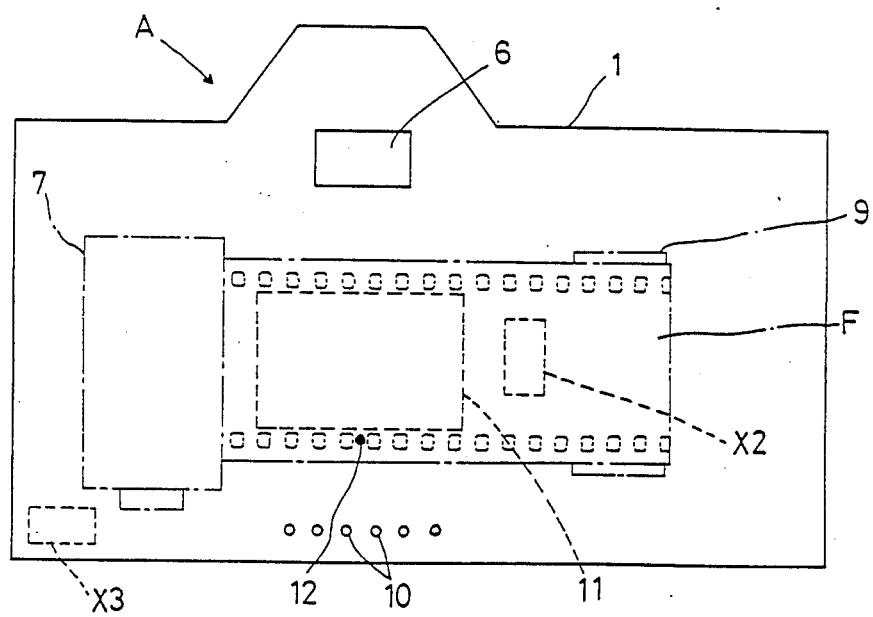
FIG. 1b is a back view showing the same.

FIGS. 1a and 1b respectively are a plan view and a back view showing an outer configuration of a photographic camera related to one preferred embodiment of the present invention.

Referring to reference marks and numerals in FIG. 1a, 'A' stands for the photographic camera, 1 for a camera body, 2 for a shutter-release button, 3 for a light intake window, 4 for a group of setting switches for setting various information and 5 stands for a display section for displaying the various information, respectively.

The light intake window 3, constituted by a milky white plate, includes at a lower portion thereof a light source color measuring sensor. The group of setting switches 4 include switches for setting various information such as a time value (shutter speed) Tv, an aperture value Av, a film speed value Sv (ISO), an exposure mode, a trimming, a drive mode, an exposure reference and the like and also includes a +/− switch for increment and decrement operations needed for the setting. The display section 5 includes at a rear region thereof ( a lower region in the figure) a portion 5a for displaying whether an IC card is attached or not and the display section 5 includes at a forward region thereof (an upper region in the figure) a portion 5b for displaying the various photographic information, the display portion 5a adapted to illuminate to provide a warning in case the IC card is not attached.

Figure 6:
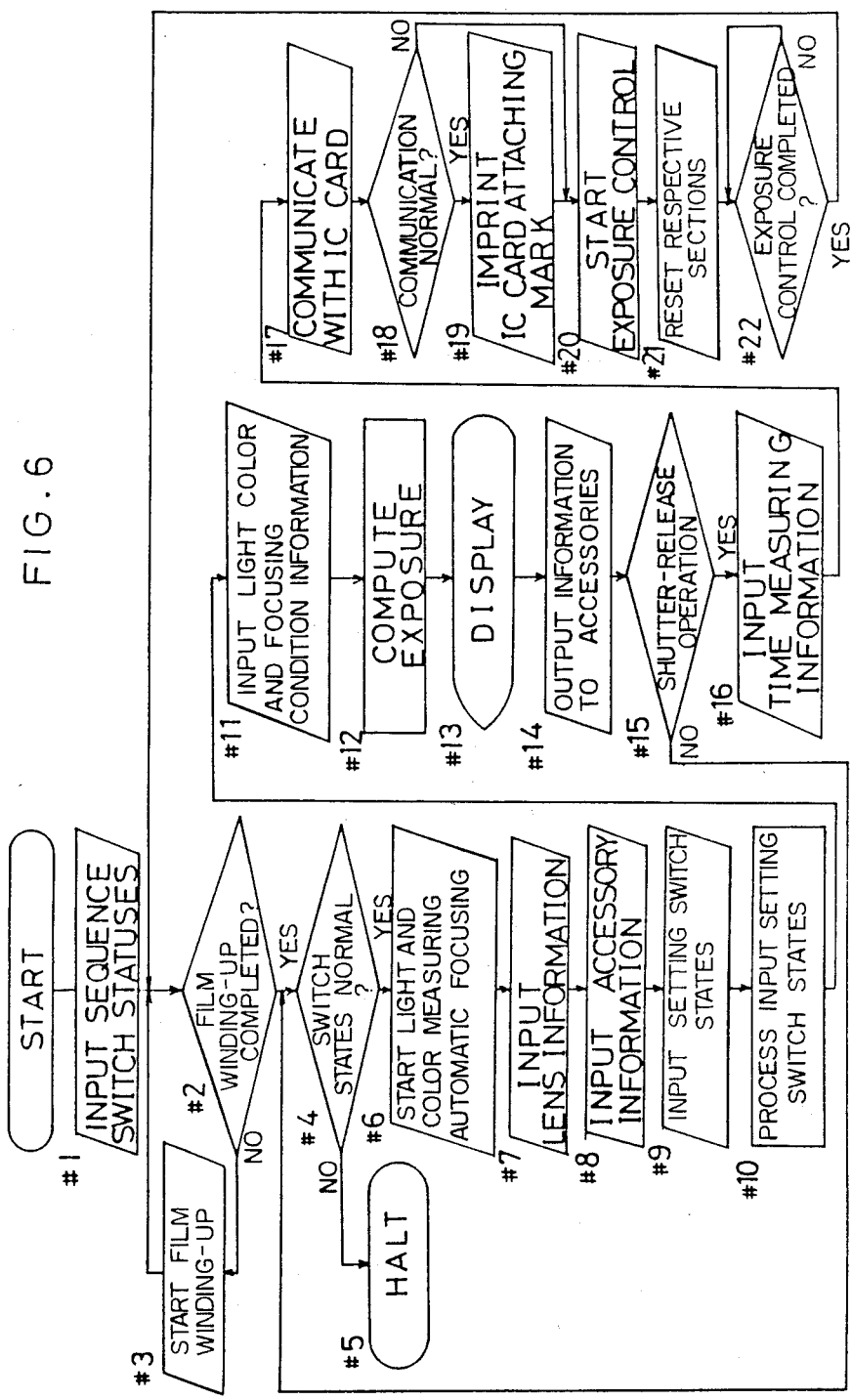
FIG. 6 is a schematic flow chart illustrating functions of a microcomputer housed in the camera body.

Referring to reference marks and numerals in FIG. 1b, 6 stands for a viewfinder, 7 for a film cartridge, 'F' for a film, 9 for a spool, 10 stands for a terminal for transmitting signals between a back lid and the camera body, 11 for an imager frame and 12 stands for a light emitting diode for imprinting an IC card attaching mark.

Figure 2A:
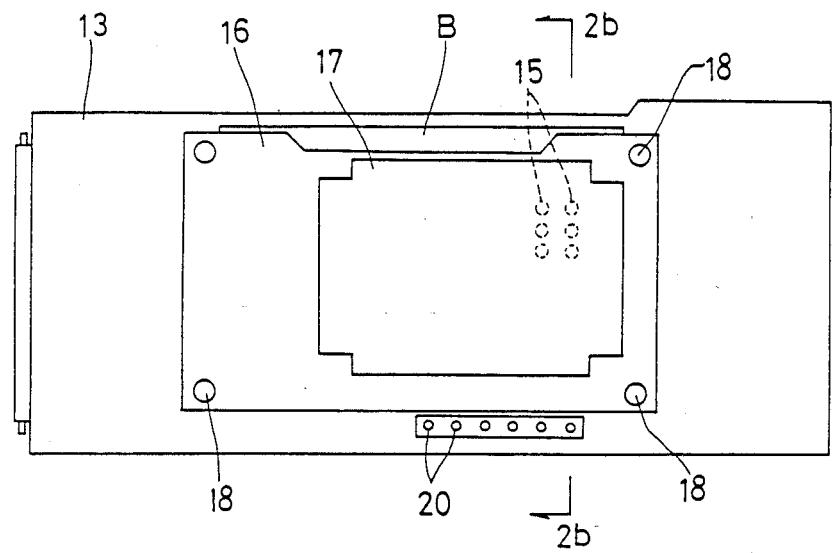
FIG. 2a is a front view of a back lid of the photographic camera of the present invention.
Figure 2B:
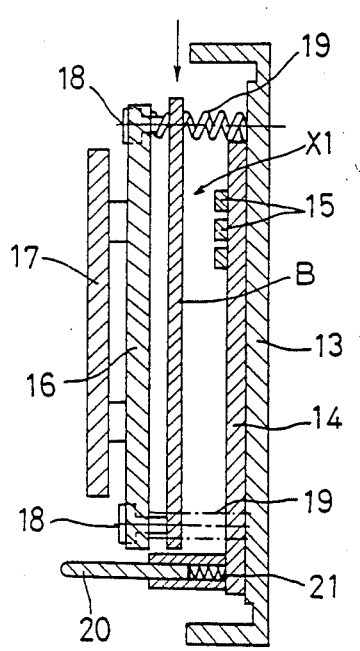
FIG. 2b is a sectional view taken along line 2b—2b of FIG. 2a, FIG. 3 is block circuit diagram illustrating a whole system of the photographic camera of the present invention.

FIGS. 2a and 2b are a front view showing a back lid of the data recording photographic camera and a section view taken long line 2b—2b in FIG. 2a, respectively.

Referring to reference marks and numerals in FIGS. 2a and 2b, 13 stands for the back lid detachably attached to the camera body 1, 14 for a base plate, 15 for a terminal with the IC card 'B', 16 for an IC card pressing plate, 17 for a film pressure plate formed integratedly with the IC card pressing plate 16, 18 for a guide bar for guiding forward and backward transportation of the IC card pressing plate 16, 19 for a spring attached about the guide bar 18 and adapted for urging the IC card pressing plate 16 in a direction away from the back lid 13, 20 for a connector pin for the terminal 10 of the camera body 1 and a reference numeral 21 stands for a spring for urging the connector pin 20 in a direction away from the back lid 13. On the base plate 14, the terminal 15 and the connector pin 20 are electrically connected to each other.

A portion between the base plate 14 and the IC card pressing plate 16 constitutes an IC card attaching section X1. When the IC card 'B' is inserted from above this section X1 and then the back lid 13 is closed, the film pressure plate 17 is urged against the camera body 1 against the urging force of the spring 19, whereby the IC card pressing plate 16, presses the IC card 'B' rightwardly in FIG. 2b and the IC card 'B' comes into an electrical contact with the terminal 15. Concurrently therewith, the connector pin 20 comes into contact with the terminal 10 of the camera body 1 and becomes urged by an urging force of the spring 21 thereagainst, whereby the IC card 'B' and the camera body 1 come into electrical contact with each other.

Figure 3:
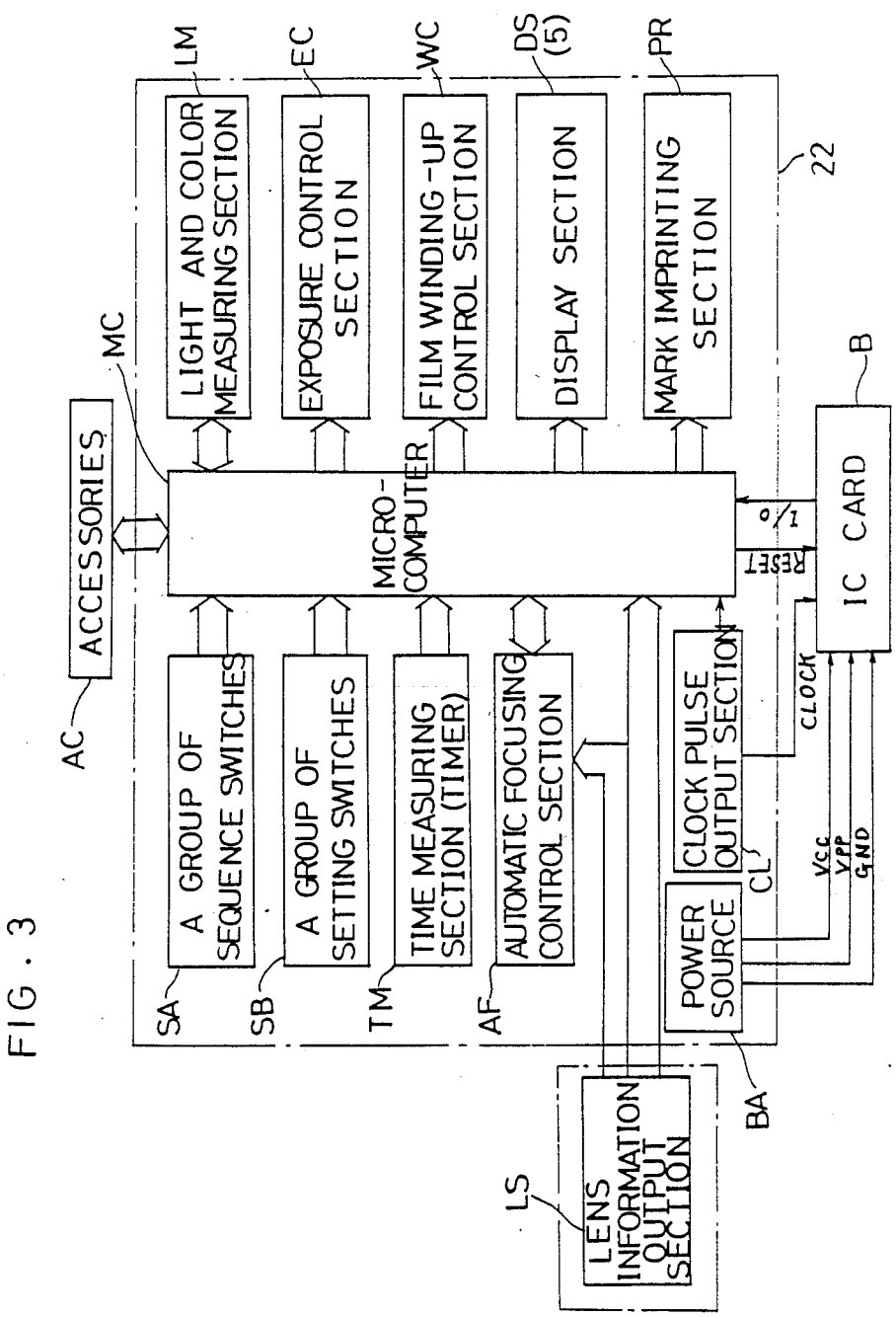

FIG. 3 is a block circuit diagram showing the whole system of the photographic camera.

Referring to the same figure, a portion surrounded by a chain line 22 denotes an inside of the camera body 1. A reference mark MC denotes a microcomputer and a mark LM denotes a light measuring section, which measures an object luminance and a light source color and then outputs as a digital signal light and color measurement data to the microcomputer MC. A reference mark EC denotes an exposure control section, which controls a diaphragm aperture and a shutter speed based on the values Tv and Av obtained by the microcomputer MC. A reference mark WC denotes a film winding-up control section, which controls a motor (not shown) for winding-up and rewinding the film 'F' and for cocking various mechanisms such as the shutter and mirror. A reference mark DS denotes a display section for displaying the various photographic information. This display section DS corresponds to the display section 5 in FIG. 1a. A reference mark PR denotes a mark imprinting section for referring the film F to the IC card 'B'.

A reference mark SA denotes a group of sequence switches carrying out, based on the condition of the camera detected by the microcomputer MC, sequential controls such as a shutter release—an exposure—a film winding-up a film rewinding, and so on. This group of sequence switches includes a shutter release switch, a switch for detecting a completion of the film winding-up operation and other switches. A reference mark SB denotes a group of setting switches corresponding to the group of setting switches 4 in FIG. 1a. This group of setting switches SB include switches for setting a time value (shutter speed) and an aperture value, a switch for altering the exposure mode (e.g. shutter speed priority exposure control mode, aperture priority exposure control mode), a switch for setting trimming and exposure reference and other switches. A reference mark TM denotes a timer, a mark AF denotes an automatic focusing control section for measuring distance or detecting a focusing condition and for controlling a lens, a mark LS denotes a lens information output section provided in a lens for outputting lens information concerning photographing and automatic focusing operation, a mark BA denotes a power source housed in the camera body 1 and adapted for supplying power to the microcomputer MC and to other blocks based on control signals (not shown) from the microcomputer MC, a mark CL denotes a clock pulse generating section for outputting clock pulses, based on the control signals (not shown) from the microcomputer MC, to the microcomputer MC and to the IC card 'B', and a mark AC denotes accessories such as an electronic flash device, a data imprinting device, a winder and the like.

Figure 4:
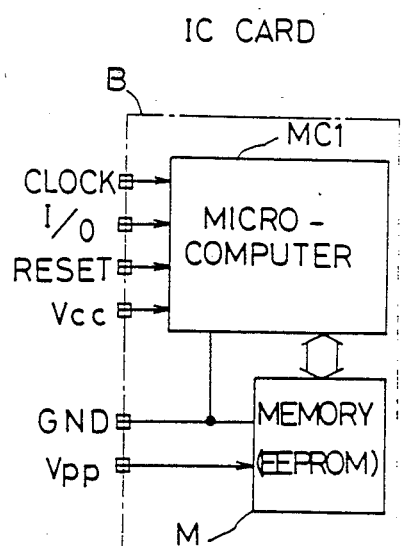
FIG. 4 is a block circuit diagram showing an inner construction of an IC card.

The IC card 'B' comprises an LSI-built-in plastic card, which inner construction is shown in FIG. 4.

The IC card 'B' includes a microcomputer MC1 and a memory M constituted by an electrically erasable programmable ROM (will be referred to as EEPROM hereinafter). The IC card 'B' has six external terminals for the clock, data input and output, reset, power and for grounding and the IC card 'B' is connected to the camera body 1 as shown in FIG. 3.

Figure 5:
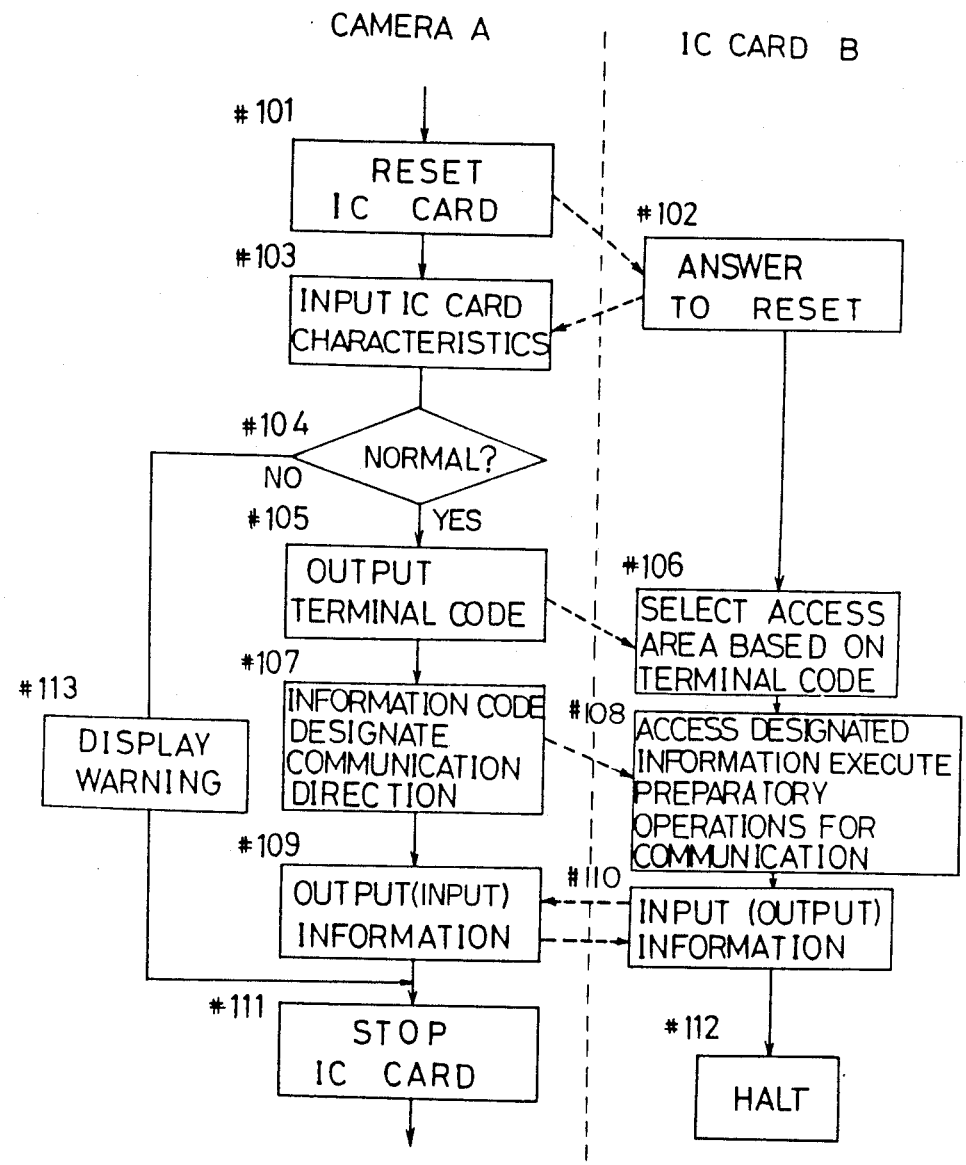
FIG. 5 is a flow chart illustrating exchanges of signals executed between a camera body and the IC card.

FIG. 5 is a flow chart showing bidirectional signal communications between the camera 'A' and the IC card 'B'.

Referring to the same figure, at step #101, the microcomputer MC housed in the camera body 1 resets the IC card 'B' At step #102, the microcomputer MC1 receiving a reset signal executes an instruction 'ANSWER TO RESET', in which information needed for enabling the micromputer MC in the camera body 1 to judge predetermined characteristics of the IC card 'B' is output. This judgment of the characteristics of the IC card 'B' includes, for example, judgment of adaptabilities of power voltage, frequency and the like of the IC card 'B' to the present camera system. At step #103, the microcomputer MC in the camera body 1 inputs the information about the characteristics of the IC card 'B' output from the microcomputer MC1 of the IC card 'B'. At step #104, the microcomputer MC judges whether or not this IC card 'B' is suited for the present camera system, more specifically, the microcomputer MC diagnoses the adaptability, attaching conditions (un-attaching and erroneous attaching), failures and the like of the IC card 'B'. If the IC card 'B' is judged to be normal, at step #105 a terminal code is output to the IC card 'B'. This terminal code varies depending on terminals such as the camera, a reader/writer at a photo processing shop, an automatic printer at a laboratory and a personal computer for home-use. Therefore, at step #106, the microcomputer MC1 of the IC card 'B' judges based on the entered terminal code to what terminal the IC card 'B' has been attached and selects an accessible area in the memory 'M'. The purpose of this selection is to prevent unintentional changes in the data by restricting data accessible through a certain terminal.

At step #107, the microcomputer MC in the camera body 1 outputs to the IC card 'B' information concerning contents of communication to be carried out, e.g. a kind and a direction of the communication, and at step #108 the microcomputer MC1 of the IC card 'B' inputs this information and executes preparatory operations therefor. Thereafter, at steps #109 and #110, the microcomputer MC of the camera body 1 and the microcomputer MC1 of the IC card 'B' communicate with each other information for photographing, laboratory and the like. The various kinds of information output from the camera body 1 are stored in the memory 'M' of the IC card 'B'. With completion of the data exchange, at step #111 the microcomputer MC of the camera body 1 provides a control signal to stop the microcomputer MC1 of the IC card 'B', and then at step #112 the microcomputer MC1 is stopped.

On the other hand, if it is judged at step #104 that the IC card 'B' is not normal, a warning display indicating unadaptability, un-attaching, erroneous attaching, failure of the IC card 'B' is provided at the display section in FIG. 3 and the process executes the job at step #111.

The same algorithm as described above is executed not only for the terminal of the camera, but also for other terminals such as the reader/writer at a photo processing shop, a developing device and a printing device at a laboratory, the personal computer for home-use and so on.

FIG. 6 is a schematic flow chart illustrating functions of the microcomputer MC of the camera body 1.

Referring to the same figure, the microcomputer MC is energized for example, by setting the power source BA to 'ON' or by setting a light measuring switch to 'NO'. At step #1, statuses of the group of sequence switches SA are input. At step #2, it is judged whether or not a winding-up operation of the film 'F' has been completed. If not, the process goes on to step #3 to keep winding-up the film 'F' until its completion. With the completion, the process goes on to step #4 to judge whether or not all the other switches except the winding-up completion switch of the sequence switches are in normal states thereof, i.e. whether or not a photographic operation is possible. If not, the process goes on to step #5 to stop the microcomputer MC. On the other hand, if the switches are judged to be normal states thereof, the process goes to step #6 to provide a start signal to the light and color measuring section LM, whereby light, color and focusing condition detecting operations are started.

Next, at step #7, lens information is input from the lens information output section LS. At step #8, accessory information is input from the accessories AC. At step #9, the status of the setting switches SB are input. At step #10, the information concerning the statuses of the setting switches SB are processed. More particularly, it is judged whether or not any of the shutter speed, the aperture value, the exposure mode, the trimming setting, the exposure setting and the like has been changed through the setting switches SB. If changed, a process corresponding to this change is executed.

At step #11, information obtained as a result of the light, color and focusing condition detecting operations is input. At step #12, based on the information input at steps #7 through #11 exposure computation is carried out to obtain data, e.g. a photographing Tv value, a photographing Av value and so on, needed for exposure control, and at step #13 the result of the computation is displayed at the display section DS. At step #14, the computed values and other information needed for the accessories AC are output to the accessories AC.

The microcomputer MC repeatedly executes the sequence from steps #4 through #14 until a shutter release operation is carried out.

This sequence may be alternately programmed so as to be stopped unless the shutter release operation is carried out within a predetermined time period or so as to be repeated only while the light measuring switch (not shown) is operated.

At step 15 following the step #14, it is judged whether or not the shutter release operation has been carried out. If not, the process returns to step #4; whereas, if the operation has been carried out, the microcomputer MC communicates with the microcomputer MC1 of the IC card 'B' at step #17. This communication is carried out in accordance with the data exchange sequence shown in FIG. 5, whereby the various kinds of information output from the camera body 1 are stored in the memory 'M' of the IC card 'B'.

At step #18, it is judged whether or not the communication has been carried out normally. If so, the process goes on to step #19 to imprint into the film 'F' a mark indicating that the present film 'F' is the film for which predetermined information is stored in the memory 'M' of the IC card 'B'. More particularly, this imprinting operation is carried out by illuminating a light-emitting diode at a mark imprinting section PR. And, the purpose of this mark imprinting operation is to distinguish from other films this film 'F', for which predetermined information, e.g. the trimming information, color temperature information, a frame number, a number of printing, the exposure reference information, dates, time, various photography information, the laboratory information, information about a size of the object to be photographed, are stored in the IC card 'B'. This permits, when films are confused in the devices at the laboratory, an operator to distinguish this particular film 'F', which information is stored in the IC card 'B', from the other films and to correspond the film 'F' to this IC card 'B'. This will be more particularly described below. After imprinting the mark, the process goes on to step #20.

If it is judged at step #18 that the communication has not been carried out normally, the step #19 is skipped over and the process goes on to step #20. At step #20, an exposure control is started which controls the shutter, an aperture diaphragm and the like based on the data needed for the exposure control including the photography Tv value and the photograph Av value obtained at step #12. At step #21, signals indicating the execution of the shutter release operation are output to the respective sections thereby to reset the same. At step #22, it is waited until completion of the exposure control and then the process returns to step #2 to wind-up the film 'F' and to carry out increment of a film frame counter (repeating step 2 and step #3) and then the above job is carried out again. In place of this repetition, it is to be noted, the process may be so varied as to stop the microcomputer MC when the light measuring switch (not shown) is not operated.

In the flow shown in FIG. 6, the data exchange between the microcomputer MC of the camera body 1 and the microcomputer MC1 of the IC car 'B' is carried out each time a shutter release operation occurs. This is because of the following reason: If the data exchange is carried out during the light measuring operation, the data exceeds a write capacity ($10^4$ to $10^5$) of the present EEPROM (the memory 'M'). In the case of an IC card which does not use the EEPROM as the memory 'M', e.g. an IC card incorporating a battery and a RAM, because of its sufficiently large write capacity, it is possible to carry out the data exchange between the microcomputers MC and MC1 during the light measuring operation. Further, even with the IC card of the present invention, a communication may be executed for judging adaptability, attaching conditions, failures and the like as described as step #103 of the flow chart in FIG. 5.

The trimming information, one of the laboratory information to be stored along with other kinds of information from the microcomputer MC of the camera body 1 into the memory 'M' of the IC card 'B', will now be particularly described with reference to the following table.

| CODE | TRIMMING |
|------|----------|
| 000  | no trimming |
| 001  | a |
| 010  | b |
| 011  | no trimming + a + b |
| 101  | c |
| 110  | d |
| 111  | no trimming + c + d |

Figure 7A:
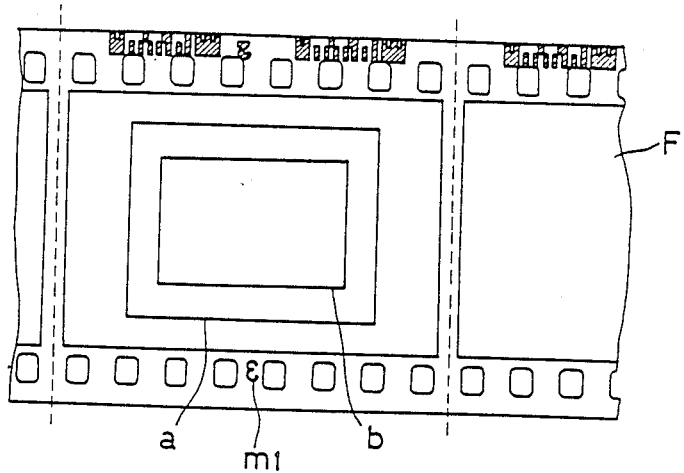
FIGS. 7a and 7b are broken front views of an exposed film.
Figure 7B:
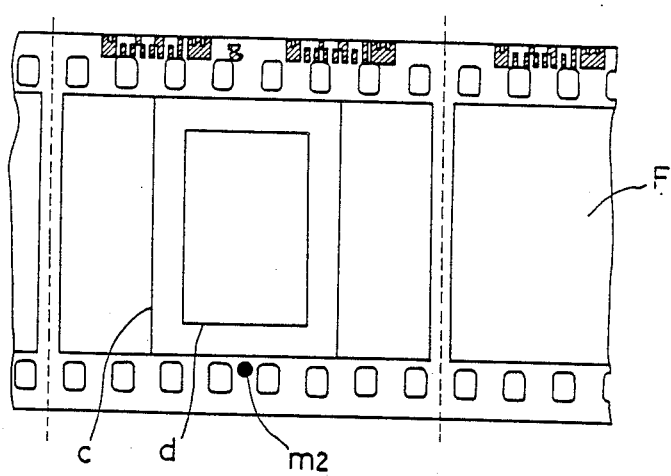

The reference marks, a, b, c, d in the above table denote areas to be printed with trimming. FIG. 7a and FIG. 7b show the areas a, b, c, d on the film 'F'.

The codes 011 and 111 designate successive trimming operations, in which a plurality of prints having different trimming sizes are printed from a same negative. That is to say, if the code 011 is stored in the memory 'M' of the IC card 'B' as trimming information, this trimming information controls the printer in the printing operation to provide three kinds of prints, a print having no trimming, a print having the trimming area 'a' and a print having the trimming area 'b' successively.

FIG. 7a shows a mark m1 and FIG. 7b shows a mark m2 which indicate the present film is identified as the film for which predetermined information is stored in the memory 'M' of the IC card 'B'. These marks m1 and m2 will be more particularly described below.

Figure 8:
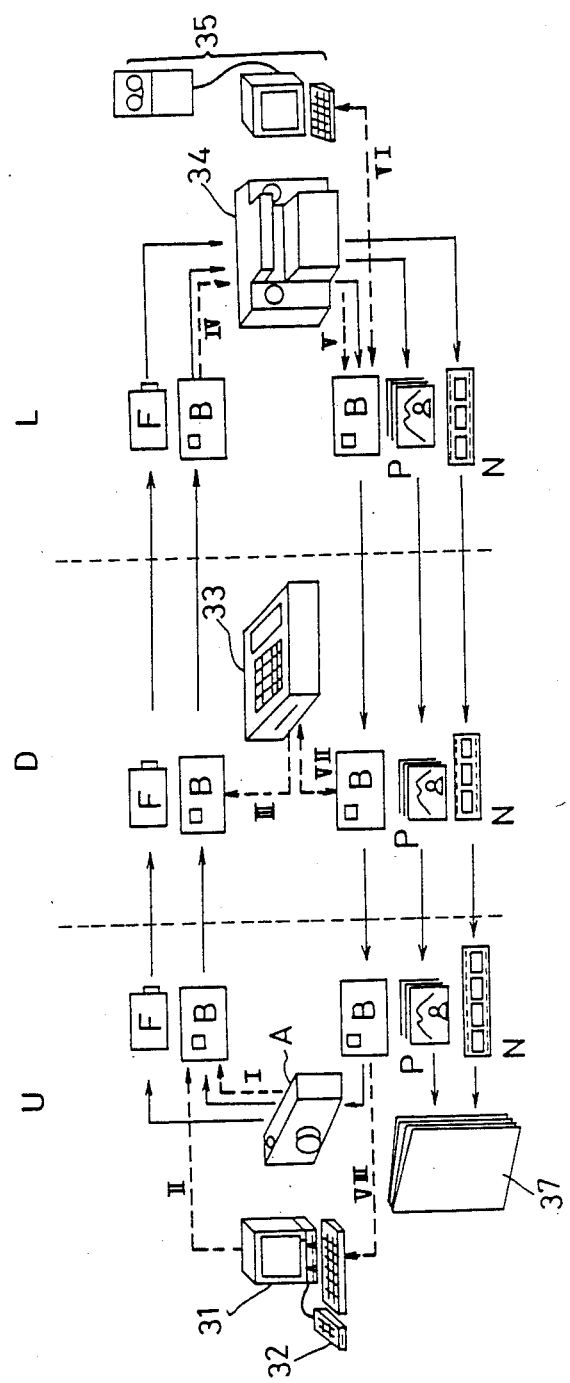
FIG. 8 is a process descriptive view illustrating flows of the IC card and the film among a user, a photo processing shop and a laboratory.

FIG. 8 is a process descriptive view illustrating flows of the IC card 'B' among a user 'U', the photo processing shop 'D' and the laboratory 'L', in which an arrow seen as a solid line denotes a flow of the hardwares (the IC card 'B', the film 'F', the print 'P', the negative film 'N') while another arrow seen as a broken line denotes a flow (inputs and outputs) of the data concerning the IC card 'B'.

When the user 'U' carries out a photographing, the memory 'M' of the IC card 'B' stores predetermined information output from the microcomputer MC of the camera 'A' including the trimming information, the color temperature information, the frame number of the film, the number of the print, the exposure reference information, the date, the time, the various photographic information, the information about the size of the photographed object (referring to the broken line I). If the user 'U' owns a terminal device 31 such as the personal computer and an IC card reader/writer 32 connectable thereto, by using these devices, the user 'U' can himself record a developing method, a site of photographing, a short message and the like in the memory 'M' of the IC card 'B' (referring to a broken line II). Further, this is possible not only when requesting the photo processing shop 'D' of the first development and printing but also when later requesting the shop to do printing.

The user 'U' takes the IC card 'B' recording the predetermined information in the above way and the film 'F' to the photo processing shop 'D'.

At the photo processing shop 'D', the IC card 'B' is set to the IC card reader/writer 33 thereby to record additional data such as a receipt number, a name and a telephone number of the user into the IC card 'B' (referring to a broken line III). In case the user is unable to carry out the process indicated by the broken line II at his/her side, such information, e.g. the size and the number of prints, the necessity and the contents of special treatment and the like, which used to be written on a paper container bag, is recorded in the IC card 'B' at the photo processing shop 'D'. It is to be noted that the IC card reader/writer has switches corresponding to the respective items on the container bag (i.e. the above informations) and is designed to be easy and convenient to use.

Both the IC card 'B' and the film 'F' received at the photo processing shop 'D' are handed to the laboratory 'L', where the film 'F' and the IC card 'B' are set to the developing device and the printer 34 to carry out development and printing based on the information output from the IC card 'B' (referrring to a broken line IV), whereby a negative film 'N' and prints 'P' are obtained.

In this case, information such as the contents of the treatment, the number of prints and a reference number is recorded in the IC card 'B' (referring to a broken line V). Further, a central computer 35 reads out the various photographing information from the IC card 'B' and processes the same statistically, and this processed information may be advantageously utilized to achieve a better photography system (referring to a broken line VI).

The negative film 'N', the print(s) 'P' and the IC card 'B' recording the additional information are returned to the photo processing shop 'D', where the IC card reader/writer 33 reads out the information recorded in the IC card 'B' and automatically calculates the processing charge (referring to a broken line VII). If this IC card 'B' may be used as a money card or as a credit card, the user does not have to pay the processing charge in cash.

After the IC card 'B', the prints 'P' and the negative film 'F' are returned to the user 'U' from the photo processing shop 'D', the user 'U' is able to read out the photographing information and the processing information through the personal computer 31 and the reader/writer 32, and the user 'U' is also able to store the above information into computer memory means such as a magnetic disk, a magnetic tape, a bubble memory and the like, or is able to record the information in the form of a hard copy by printing (referring to a broken line VIII). The print(s) 'P' is (are) stored in a photo album 37.

Also, for the user 'U' who does not own the reader/writer 32, the photo processing shop 'D' may provide service to give the user 'U', when returning the negative film and the prints, a copy on which the information recorded in the IC card 'B' are printed out at the shop or at the laboratory 'L'.

After recording necessary information in the IC card 'B' into the computer memory means and the like, the user 'U' may re-attach the IC card 'B' to the camera 'A' and use the same repeatedly.

Alternative processing flows of the IC card 'B' shown in FIG. 9 will be described next.

When the user 'U' takes the film 'F' and the IC card 'B' to the photo processing shop 'D', at this photo processing shop 'D' the data recorded in the IC card 'B' are transferred into another recording means 'B' designed exclusively for the photo processing shop 'D' and for the laboratory 'L' (a data transfer between a solid line IX and a solid line X). With this, the user 'U' does not have to leave the IC card 'B' at the shop, thus the user 'U' is able to use this IC card 'B' immediately for a next photographing. This is advantageous in that the user 'U' need not own many IC cards.

Figure 9:
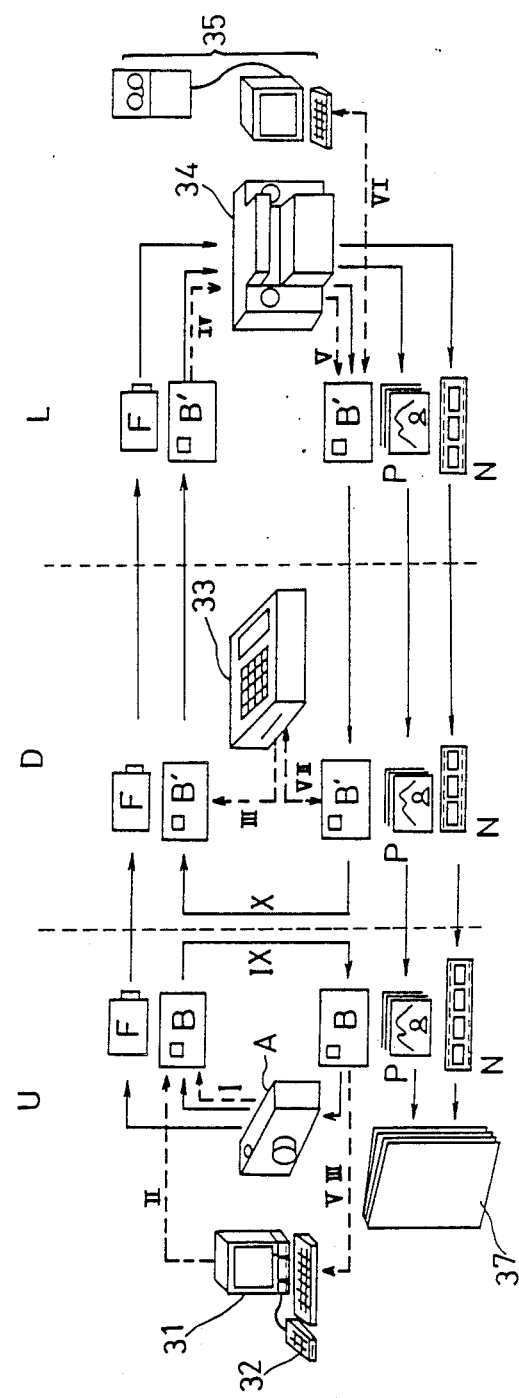
FIG. 9 is a process descriptive view illustrating alternate flows of the IC card.

The other flows shown in FIG. 9, being the same as those shown in FIG. 8, share the same reference marks for the same parts and members therewith and will not be described.

According to the above-described embodiment of the present invention, since the IC card 'B', as shown in FIG. 2, is attached to an IC card attaching portion X1 provided on an inner face of the back lid 13 of the camera 'A', the predetermined information about all exposed frames of the film 'F' is recorded in the IC card 'B' unless the back lid 13 is unintentionally opened. This is because of the following reasons.

If the IC card 'B' is attached outwardly of the camera 'A' and is freely attachable and detachable to and from the camera at any instant, there is possibility that the IC card 'B' is detached from or attached to the camera 'A' in the course of a photographing or a data exchange, or that a different IC card recording the predetermined information about frames of a different film is erroneously attached to the camera 'A' thereby causing a confusion in which the film 'F' has some frames having the IC card data and other frames having no IC card data. This results in a great difficulty in corresponding the respective frames to the IC card data at the laboratory 'L'.

In order to overcome this difficulty, a special measure must be taken which causes not only a cost increase but also a problem in designing.

In order to avoid the above inconvenience, according to the present embodiment, the IC card 'B' is attached to the IC card attaching portion X1 provided at the inner side of the back lid 13.

However, there is still a possibility at an introductory stage of the present camera system that a film exposed by a camera having no IC card data recording system and a film exposed by the present camera system may be confused with each other at the laboratory 'L'. Therefore, there is a necessity to enable the printer at the laboratory 'L' to distinguish this film 'F' processed by the present camera system from other films and to correspond the film 'F' to the IC card 'B'.

This is the reason why the mark m1 (m2) is imprinted in the film 'F' indicating that this film is the film which data are recorded in the IC card 'B'. It is not necessary to imprint this mark in all of the frames of the film 'F' since it is possible to correspond the film 'F' to the IC card 'B' by using the data about the number of times of photographing even if the mark is imprinted only in the first frame of the film 'F'.

This number mark m1 (m2) may be of the numeral type m1 (referring to FIG. 7a) corresponding to the number of exposed frames or may also be of the dot type m2 (referring to FIG. 7b) to be imprinted at the first frame or at all of the frames of the film 'F'. However, it is to be noted that the numeral type mark m1 is the more reliable in corresponding the same to the IC card 'B'.

Also, though not shown, if a different identification code is input to the respective IC card 'B' and this identification code along with the mark is imprinted in the frame(s), it becomes possible to specifically correspond one particular IC card 'B' to one particular film 'F', whereby the corresponding operation therebetween will be much more reliable.

The identification code for the IC card 'B' may be input by the user 'U' through the camera 'A' or through his/her own reader/writer 32, or the identification code may be pre-input in a manufacturing process of the IC card 'B' such that the user 'U' may freely choose a particular code when purchasing an IC card 'B'.

In the above-described embodiment, the IC card attaching portion X1 is disposed at the inside portion (between the back lid 13 and the film 'F') of the back lid 13. However, the present invention is not limited hereto. For example, as indicated by a broken line in FIG. 1b, an IC card attaching portion X2 may be provided in front of the film 'F', or alternately, an IC card attaching portion X3 may be provided inclinedly downwardly of the attaching portion for the film cartridge 7 in the camera body 1. With the former arrangement the IC card 'B' may be detached only after the film 'F' is unloaded; whereas, with the latter arrangement, like the aforementioned embodiment, the IC card 'B' may be detached without unloading the film 'F'. Further, in either case, a RAM chip may be employed as the memory means.

The present invention further discloses the following embodiments:

(i) The IC card 'B' need not be of the general type, but may have a configuration and a format specially designed for the camera system. Also, the IC card 'B' may be of the type incorporating a microcomputer, a battery and a RAM, or may be the EEPROM having no microcomputer nor battery.

(ii) The imprinting of the mark m1 (m2) in the film 'F' in the aforementioned embodiment is not always necessary.

(iii) In the aforementioned embodiment, the trimming area may be freely designated among a plurality thereof for a single frame, but this is not always necessary. Further, the information for the laboratory may not necessarily include the trimming information.

We claim:

1. A photographic camera comprising:
   an attaching portion adapted for detachably attaching an IC card including semiconductor memory means capable of reading-out/writing-in, a circuit for communicating data between the semoconductor memory means and the camera to which the IC card is loaded and a data exchange terminal for the communication of the data;
   communication means for communicating data with said IC card;
   detecting means for detecting whether or not the IC card is loaded in the camera in response to said data communication; and
   varying means for varying a camera operation in response to the detection by said detecting means.

2. A photographic camera as defined in claim 1, further comprising:
   display means for displaying whether or not the IC card is loaded in the camera; and
   changing means for changing the display contents of said display means in response to the detection by said detecting means.

3. A photographic camera as defined in claim 1, further comprising:
   outputting means for outputting information concerning the photographing thereby writing-in the information from said communication means.

* * * * *